(12) United States Patent
Hirota et al.

(10) Patent No.: US 7,392,058 B2
(45) Date of Patent: Jun. 24, 2008

(54) COMMUNICATION TERMINAL DEVICE, INFORMATION PROVIDING DEVICE, AND CELLULAR TELEPHONE SYSTEM

(75) Inventors: Jun Hirota, Fukaya (JP); Masaki Kinoshita, Saku (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 474 days.

(21) Appl. No.: 11/118,380

(22) Filed: May 2, 2005

(65) Prior Publication Data

US 2005/0256966 A1    Nov. 17, 2005

(30) Foreign Application Priority Data

May 13, 2004    (JP)    ............... 2004-144002

(51) Int. Cl.
*H04M 1/00*    (2006.01)
(52) U.S. Cl. ........... 455/550.1; 455/566; 455/412.2
(58) Field of Classification Search ............ 455/566, 455/574, 575.1, 550.1, 412.2
See application file for complete search history.

(56) References Cited

U.S. PATENT DOCUMENTS

| 6,714,270 | B2  |   | 3/2004 | Seiki et al. |
| 6,879,842 | B2  | * | 4/2005 | King et al. ............ 455/550.1 |

| 2002/0050526 | A1 | 5/2002 | Swartz et al. |
| 2002/0083157 | A1 | 6/2002 | Sekiguchi et al. |
| 2003/0156074 | A1 | 8/2003 | Ranganathan et al. |

FOREIGN PATENT DOCUMENTS

| CN | 1344088      A  | 4/2002  |
| EP | 1 182 845    A2 | 2/2002  |
| EP | 1 244 275    A1 | 9/2002  |
| JP | 2002-303863     | 10/2002 |
| WO | WO 03/012623 A2 | 2/2003  |
| WO | WO 2004/014049 A2 | 2/2004 |

* cited by examiner

*Primary Examiner*—Joseph Feild
*Assistant Examiner*—S. Smith
(74) *Attorney, Agent, or Firm*—Oblon, Spivak, McClelland, Maier & Neustadt, P.C.

(57) ABSTRACT

A communication terminal device includes a first display part configured to display streaming sub information, a second display part configured to display streaming main information related to the streaming sub information, a sub information reception unit configured to receive the streaming sub information sequentially transmitted from an information providing device and to display the received streaming sub information on the first display part, a request transmission unit configured to transmit to the information providing device an information request signal for requesting the streaming main information related to the streaming sub information displayed on the first display part, and a main information reception unit configured to receive the streaming main information and to display the streaming main information on the second display part.

7 Claims, 5 Drawing Sheets

COMMUNICATION TERMINAL DEVICE, INFORMATION PROVIDING DEVICE, AND CELLULAR TELEPHONE SYSTEM

CROSS-REFERENCE TO RELATED APPLICATIONS

This application is based upon and claims the benefit of priority from Japanese Patent Application No. 2004-144002 filed May 13, 2004; the entire contents of which are incorporated herein by reference.

BACKGROUND OF THE INVENTION

1. Field of the Invention

The present invention relates to a communication terminal device configured to receive and display streaming main information, an information providing device configured to transmit the streaming main information to the communication terminal device, and a cellular telephone system including the communication terminal device and the information providing device.

2. Description of the Related Art

Along with remarkable developments of information technologies in recent years and practical application of active matrix liquid crystal display devices which can achieve high-definition color display, cellular telephones are becoming able to achieve higher performances, smaller sizes, lighter weights, and lower power consumption. In particular, display screens can achieve high-contrast and clear display by use of active matrix liquid crystal display devices, and smooth display without afterimages and flickers upon movie display.

A cellular telephone generally includes two liquid crystal display panels, namely, a main display panel and a sub display panel. Moreover, each of the display panels performs bright and clear display in a light transmission method mainly using a backlight when the display panel is in use, and performs display with low power consumption in a light reflection method without using the backlight when the display panel is not in use. Incidentally, Japanese Unexamined Patent Publication No. 2002-303863 discloses a liquid crystal display device applying the light transmission method.

As described above, in terms of a cellular telephone which is likely to achieve higher performances and lower power consumption, research and development to achieve even higher performances while maintaining lower power consumption is now in progress. Particularly, there is a demand that a user who does not always browse a cellular telephone wishes to browse an image at once when necessary.

For example, in a case where a soccer game is taking place, a user does not watch relayed images of the soccer game all the time but wishes to browse an image of scoring a goal at once when the user recognizes the goal. However, a conventional cellular telephone cannot allow the user to browse such an image of scoring a goal at once.

SUMMARY OF THE INVENTION

An object of the present invention is to provide a communication terminal device and an information providing device, which are capable of allowing a user to browse desired information at once out of streaming sub information transmitted thereto.

A communication terminal device according to the present invention includes a first display part configured to display streaming sub information, a second display part configured to display streaming main information related to the streaming sub information, a sub information reception unit configured to receive the streaming sub information sequentially transmitted from a server and to display the received streaming sub information on the first display part, a request transmission unit configured to transmit an information request signal to the server for requesting the streaming main information related to the streaming sub information displayed on the first display part, and a main information reception unit configured to receive the streaming main information and to display the streaming main information on the second display part.

Meanwhile, an information providing system according to the present invention includes a sub information transmission unit configured to transmit a plurality of pieces of streaming sub information, a reception unit configured to receive an information request signal from a communication terminal device for requesting streaming main information related to the respective pieces of the streaming sub information, and a main information transmission unit configured to transmit the streaming main information to the communication terminal device.

DESCRIPTION OF THE EMBODIMENT

Now, an embodiment of the present invention will be described with reference to the accompanying drawings.

Figure 1:
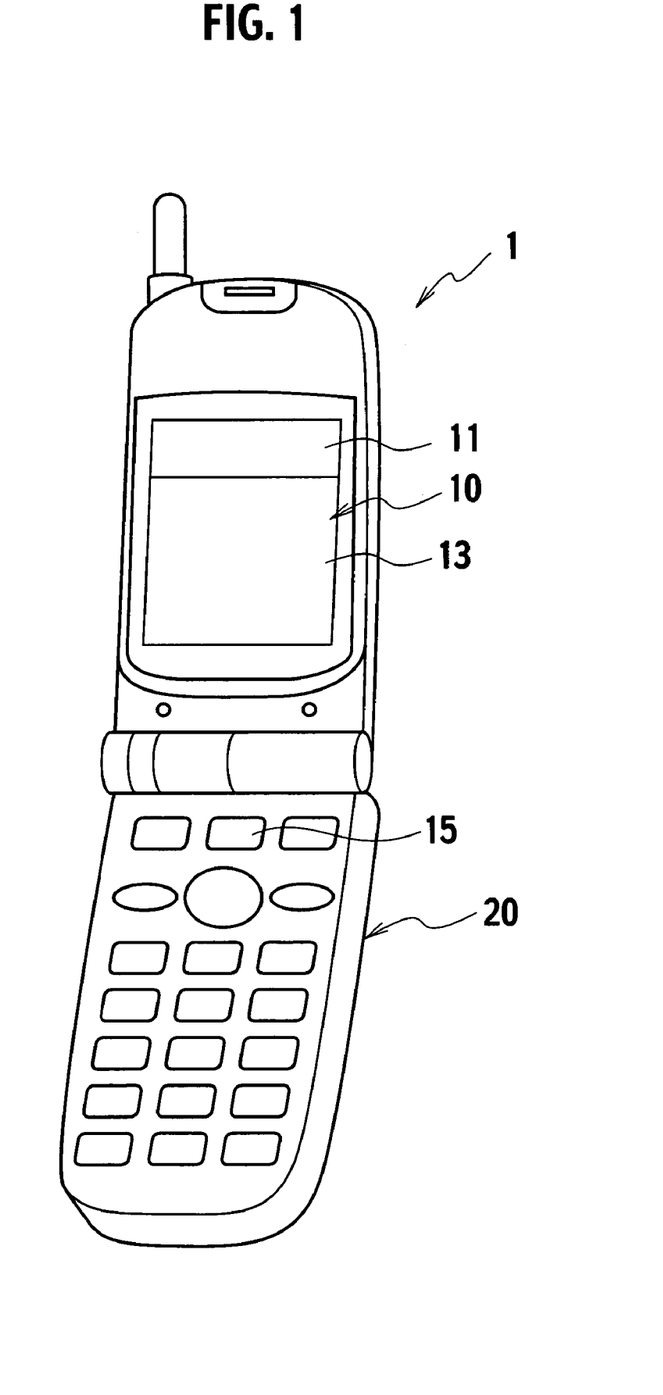
FIG. 1 is a perspective view showing an external structure of a cellular telephone according to an embodiment of the present invention.

FIG. 1 is a perspective view showing an external structure of a cellular telephone 1 (a communication terminal device) used in an embodiment of the present invention. The cellular telephone 1 illustrated herein is an example of a folding cellular telephone. Moreover, in this cellular telephone 1, a main display unit 10 is provided on one of inner surfaces which face each other when folded, and an operation unit 20 is provided on the other inner surface. The operation unit 20 includes a plurality of operation keys (such as number keys) for inputting telephone numbers and the like, and a hot key 15 to be described later.

The main display unit 10 includes a first display part 11 which is a relatively small display area provided on an upper part of the main display unit 10, and a second display part 13 which is a relatively large display area provided below the first display part 11.

The first display part 11 is configured to be capable of displaying information in a light reflection method without using a backlight. Meanwhile, the first display part 11 is a relatively small display area as illustrated, which can display relatively a small amount of information. For example, the relatively small amount of information may be character information equivalent to a certain number of characters (such as ten characters in one row) displayed either in black and white or relatively in a small number of colors, or a simple image displayed either in black and white or relatively in a small number of colors. Here, the first display part 11 may apply a light transmission method or a semi-transparent method for displaying the information.

The second display part 13 applies the light transmission method using a backlight or the semi-transparent method, and is configured to display not only character information but also a variety of information such as still images or moving images more clearly in full colors. Moreover, the cellular telephone 1 is provided with an unillustrated storage unit made of a RAM and the like so as to appropriately select various contents supplied thereto and to display the contents on the display units 11 and 13.

Figure 2:
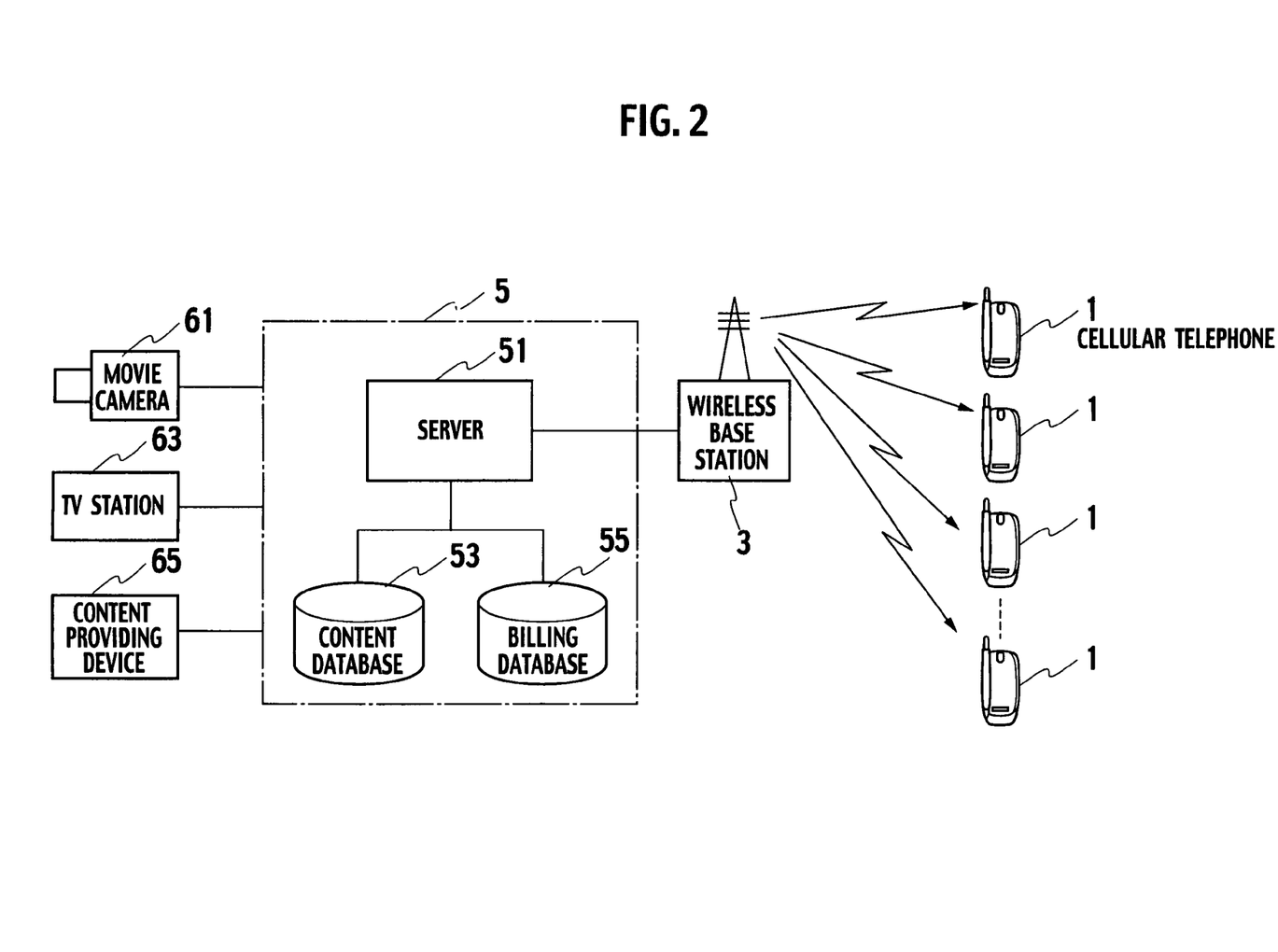
FIG. 2 is a view showing an overall configuration of a cellular telephone system according to the embodiment of the present invention.

FIG. 2 is an overall diagram of a cellular telephone system according to the embodiment of the present invention. The cellular telephone system illustrated herein includes: a plurality of cellular telephones 1 (see FIG. 1), a wireless base station 3 configured to communicate with each cellular telephone 1 through radio links; an information providing system 5 connected to the wireless base station 3; and a movie camera 61, a television (TV) station 63 and a content providing device 65, which are respectively connected to the information providing system 5. The movie camera 61, the television (TV) station 63, and the content providing device 65 supply various contents including still images and moving images (such as relayed sport images, news, movies, map information or book information) respectively to the information providing system 5.

The information providing system 5 includes a server 51 configured to supply contents to the cellular telephones 1, a content database 53 registering (storing) contents supplied from the content providing device 65 and the like, and a billing database 55 configured to register billing information for each cellular telephone 1 provided with streaming main information to be described later.

To the numerous cellular telephones 1 connected by the radio links through the wireless base station 3, the information providing system 5 illustrated herein transmits moving image information received from the movie camera 61, continuous television information (such as soccer games or baseball games relayed by the television station 63) received from the television station 63, and the like, for example, as the streaming main information. To be more precise, the information providing system 5 just transmits the streaming main information continuously (without processing) to each cellular telephone 1 as relayed information.

Moreover, the information providing system 5 sequentially transmits streaming sub information extracted (abstracted) from the continuous streaming main information to each cellular telephone 1 by use of the push technology. The streaming sub information may be information extracted for a predetermined period of time (one to several seconds, for example) at given timing from the streaming main information, abstract information of the streaming main information extracted from the streaming main information for a predetermined period of time, and the like. Here, as for the timing to extract the streaming sub information, it is conceivable to extract at a unit of an event or to sample at a predetermined time interval (such as a time interval of five minutes), for example.

Figure 3A:
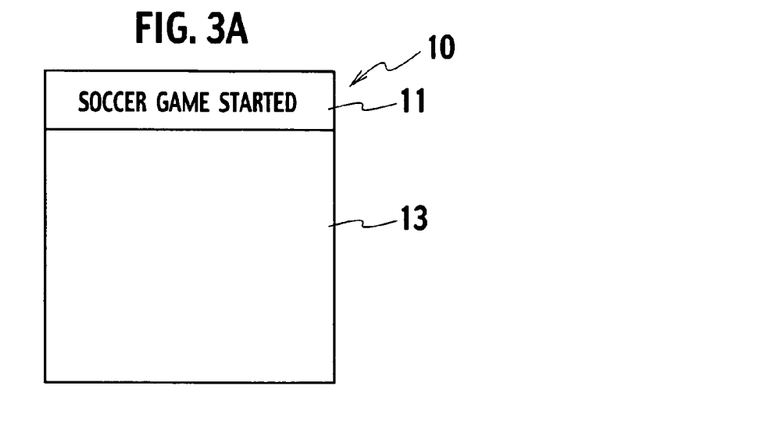
FIG. 3A is a view showing an example of display information to be displayed on a main display unit of a cellular telephone.
Figure 3B:
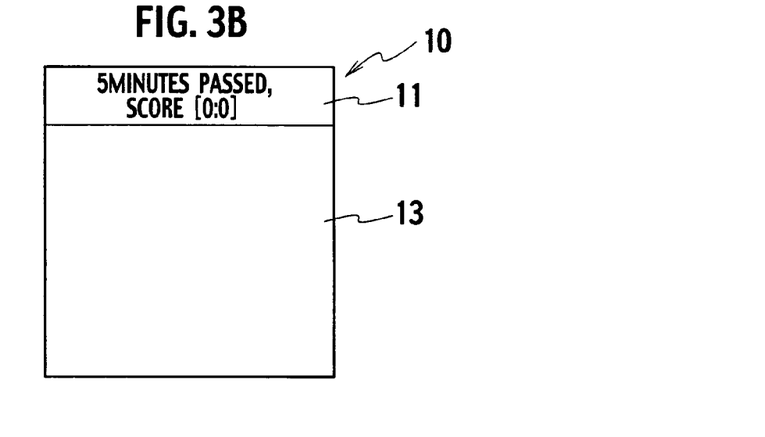
FIG. 3B is a view showing another example of the display information to be displayed on the main display unit of the cellular telephone.
Figure 3C:
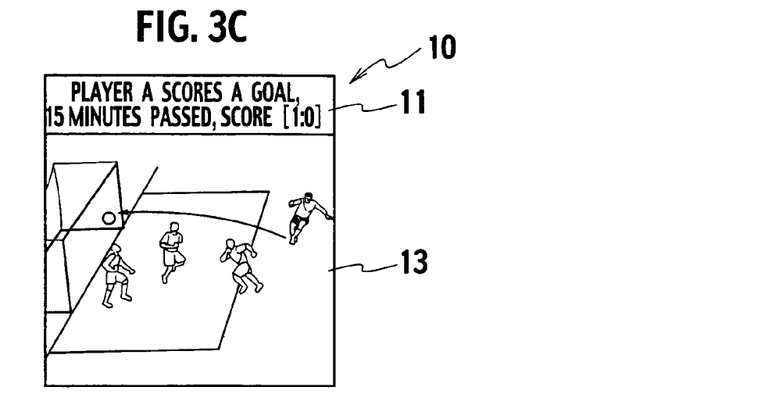
FIG. 3C is a view showing still another example of the display information to be displayed on the main display unit of the cellular telephone.

When the streaming main information is continuous information of a soccer game relayed continuously from the beginning to the end, for example, the streaming sub information is assumed to be abstracts of the contents of the streaming main information extracted at intervals of five minutes. To be more precise, as shown in FIG. 3A to FIG. 3C, for example, the streaming sub information such as "Soccer game started", "5 minutes passed, score [0:0]" or "Player A scores a goal, 15 minutes, [1:0]" is transmitted at given timing either as character information or as simple image information. Here, the streaming sub information may be the original streaming main information extracted at the predetermined time interval, abstract information of the contents of the streaming main information extracted at given intervals which is abstracted into characters and the like, abstract information abstracting the contents of progress until a time of extraction of the streaming main information, and the like.

As described above, when the information providing system 5 transmits the streaming sub information to the cellular telephone 1 at the given intervals, the cellular telephone 1 sequentially receives the transmitted streaming sub information. Then, the cellular telephone 1 stores the received streaming sub information in the storage unit such as a RAM, and displays the received streaming sub information on the first display part 11.

Therefore, a user of the cellular telephone 1 can recognize the progress of the soccer game, for example, by browsing the streaming sub information which is displayed on the first display part 11 every five minutes, for example. Moreover, while the streaming sub information displayed on the first display part 11 is changed every five minutes and when the user of the cellular telephone 1 sees that the streaming sub information including the character information (or the image information) representing "Player A scores a goal, 15 minutes, [1:0]" is displayed on the first display part 11 as shown in FIG. 3C, the user performs a prescribed operation such as pressing the hot key 15. In this way, the streaming main information related to the streaming sub information "Player A scores a goal, 15 minutes, [1:0]" (such as relay information of a moment when the player A made a shot on a goal) is displayed at once on the second display part 13 in detail and in full colors. Accordingly, the user of the cellular telephone 1 can browse only important images such as the moment of the goal efficiently without watching the soccer game all the time.

Alternatively, the information providing system 5 may be configured not only to transmit one piece of relay information (such as a soccer game) from the wireless base station 3 as the streaming main information but also to transmit a plurality of pieces (about 100 types, for example) of streaming main information from the wireless base station.

Here, the streaming main information may be relays of soccer games or baseball games, relays of serious incidents, relays of news programs, relays of dramas, relays of scenes of tourist spots, relays of ski areas, and the like. Moreover, in terms of relays of soccer games, it is possible to relay a plurality of games such as a game between Team A and Team B, a game between Team C and Team D, and the like. Furthermore, in terms of relays of baseball games, it is possible to relay not only one game but also to relay a plurality of games including Major League Baseball games, for example.

Thereafter, the information providing system 5 transmits a plurality of pieces of streaming sub information respectively corresponding to the plurality of pieces of streaming main information separately at given time intervals from the wireless base station 3 by use of individual channels or codes.

Figure 5:
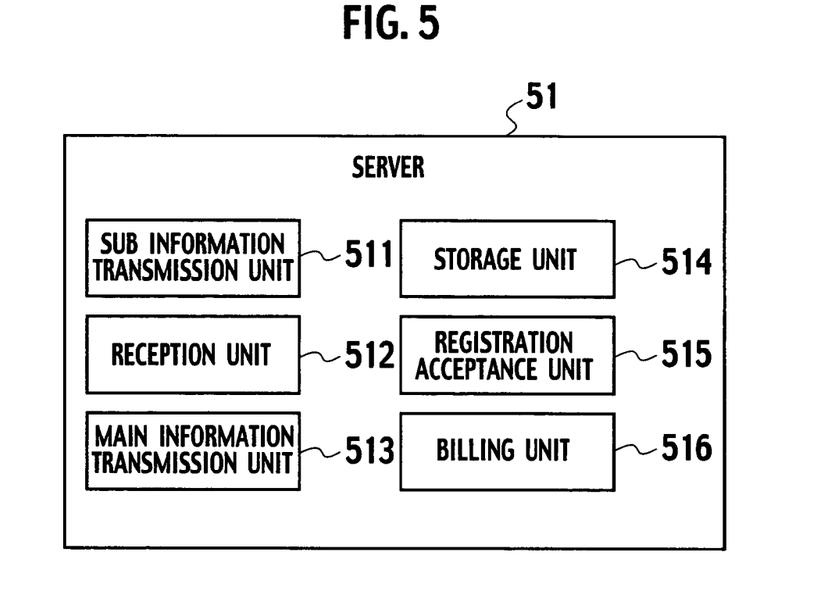
FIG. 5 is a functional block diagram of a server.

Specifically, to achieve the above-described functions, the server 51 of the information providing system 5 includes a sub information transmission unit 511, a reception unit 512, a main information transmission unit 513, a storage unit 514, a registration acceptance unit 515, and a billing unit 516 as shown in FIG. 5.

The sub information transmission unit 511 sequentially transmits the plurality of pieces of streaming sub information from the wireless base station 3 to the cellular telephones 1 through the radio links. The reception unit 512 receives an information request signal for the streaming main information, which is transmitted from the cellular telephone 1 through the radio link, through the wireless base station 3 together with terminal identification information for identifying the cellular telephone 1. The main information transmission unit 513 transmits the streaming main information specified by the information request signal received by the reception unit 513 from the wireless base station 3 to the cellular telephone 1 identified by the terminal identification information through the radio link. The billing unit 516 charges a fee to the cellular telephone 1 when the streaming main information is transmitted to the cellular telephone 1 in response to the information request signal.

Figure 6:
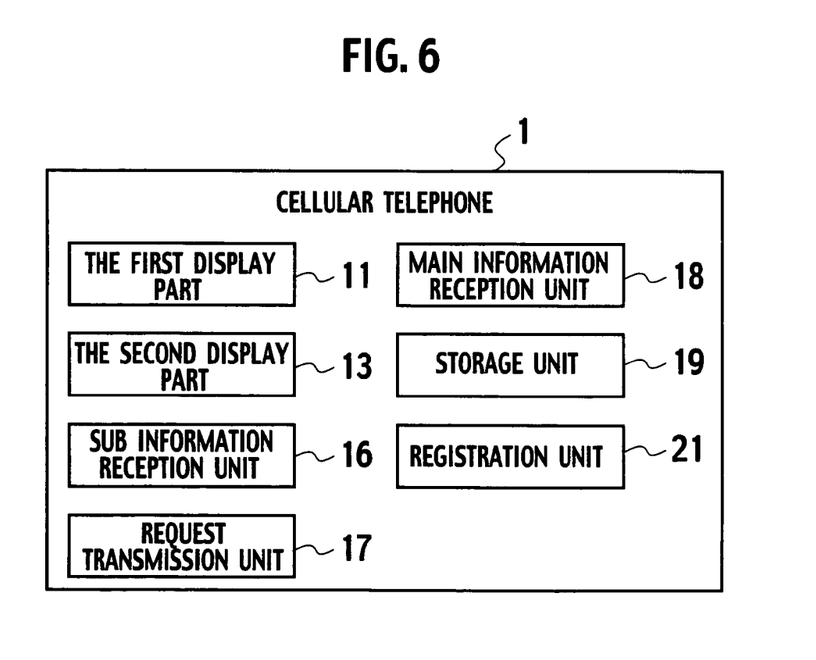
FIG. 6 is a functional block diagram of a cellular telephone.

Meanwhile, as shown in FIG. 6, the cellular telephone 1 includes the first display part 11, the second display part 13, a sub information reception unit 16, a request transmission unit 17, a main information reception unit 18, a storage unit 19, and a registration unit 21. The first display part 11 displays the streaming sub information. The second display part 13 displays the streaming main information related to the streaming sub information.

The sub information reception unit 16 selectively receives the streaming sub information transmitted from the wireless base station 3 through the radio link, and controls the streaming sub information to be displayed on the first display part 11. When the streaming sub information is displayed on the first display part 11, the request transmission unit 17 transmits the information request signal for requesting the streaming main information to the wireless base station 3 through the radio link together with the terminal identification information for identifying the cellular telephone 1 upon a prescribed operation such as an operation of the hot key 15 (see FIG. 1). The main information reception unit 18 receives the streaming main information transmitted from the wireless base station 3 through the radio link in response to the information request signal, and controls the streaming main information to be displayed on the second display part 13.

Next, operations of the information providing system 5 and the cellular telephone 1 configured as described above will be explained.

Firstly, the server 51 of the information providing system 5 receives a plurality of pieces of streaming main information such as the relay information (of the soccer game or the baseball game, for example) from the television station 63 and the like. Then, the server 51 accumulates the plurality of pieces of streaming main information thus received in the content DB 53 (or in an unillustrated recording device) as video information when appropriate. Meanwhile, the server 51 samples the plurality of pieces of streaming main information every five minutes, for example, and generates a plurality of pieces of streaming sub information at each time of sampling in terms of each piece of the streaming main information. Here, the streaming sub information may be character information, simple image information, and the like, for example. Then, the sub information transmission unit 511 of the server 51 transmits the plurality of pieces of streaming sub information thus generated from the wireless base station 3 to the cellular telephone 1 through the radio link.

The sub information reception unit 16 of each of the cellular telephones 1 selectively receives desired streaming sub information (such as a soccer game) out of the plurality of pieces of streaming sub information transmitted from the wireless base station 3. Then, the sub information reception unit 16 displays the streaming sub information thus received onto the first display part 11 of the main display unit 10 as shown in FIG. 3A. Here, in FIG. 3A, the streaming sub information ("Soccer game started") is displayed on the first display part 11 of the main display unit 10 of the cellular telephone 1 as the character information. That is, the streaming sub information indicates that the soccer game has been now started at the moment of display.

The user of the cellular telephone 1 browses the streaming sub information displayed on the first display part 11 every five minutes, for example, as appropriate. To be more precise, after passage of five minutes from the time when the streaming sub information is displayed as shown in FIG. 3A, the streaming sub information ("5 minutes passed, score [0:0]") at the time is displayed on the first display part 11 as shown in FIG. 3B. The user can browse this streaming sub information and recognize that the score of the soccer game is 0 to 0 and neither of the teams has scored a goal yet.

Then, after passage of a given period of time, the streaming sub information ("Player A scores a goal, 15 minutes, [1:0]"), for example, as shown in FIG. 3C is assumed to be displayed on the first display part 11 of the cellular telephone 1. The user of the cellular telephone 1 performs the prescribed operation such as the operation of the hot key 15 of the operation unit 20 of the cellular telephone 1 when the user wishes to watch the goal scene of this player A.

When the prescribed operation such as the operation of the hot key 15 is performed, the request transmission unit 17 of the cellular telephone 1 generates the information request signal for requesting the streaming main information, and transmits the information request signal to the wireless base station 3. Here, the information request signal includes specified information for specifying the streaming sub information displayed on the first display part 11 at the time of the prescribed operation, and the terminal identification information for identifying the cellular telephone 1.

Note that the specified information for specifying the streaming sub information displayed on the first display part 11 at the time of the prescribed operation is equivalent to information transmitted from the information providing system 5 through the wireless base station 3 together with the received streaming sub information when the cellular telephone 1 selectively receives the desired streaming sub information out of the plurality of pieces of streaming sub information.

Specifically, the sub information reception unit 16 of the cellular telephone 1 receives the streaming sub information and the specified information out of the received streaming sub information at the same time, and stores the information in the storage unit 19 such as a memory. Then, the request transmission unit 17 acquires the specified information for specifying the streaming sub information displayed at the moment of the prescribed operation from the storage unit 19, and transmits the information request signal including the specified information and the terminal identification information. Here, the terminal identification information for identifying the cellular telephone 1 is also assumed to be stored in the storage unit 19 in advance.

Meanwhile, the sub information transmission unit 511 of the server 51 of the information providing system 5 transmits the specified information for specifying each piece of the streaming sub information together with each piece of the streaming sub information. Meanwhile, the reception unit 512 receives the information request signal including the specified information and the terminal identification information from the cellular telephone 1 through the wireless base station 3. Then, the main information transmission unit 513 transmits the streaming main information corresponding to the streaming sub information specified by the received specified information to the cellular telephone 1 relevant to the received terminal identification information. Specifically, the main information transmission unit 513 transmits the streaming main information, which is specified by the specified information and is being received from the television station 63 or the like (or is being recorded in the recording device as the video information) to the cellular telephone 1 identified by the terminal identification information.

The main information reception unit 18 of the cellular telephone 1 receives the streaming main information corresponding to the information request signal, and displays the streaming main information thus received on the second display part 13 (see FIG. 3C). Specifically, the streaming main information (such as a full-color image at the time when the player A made a shot on a goal) corresponding to the streaming sub information ("Player A scores a goal, 15 minutes, [1:0]") is displayed on the second display part 13 of the cellular telephone 1.

Thereafter, when the streaming main information is transmitted to the cellular telephone 1, the billing unit 516 of the server 51 performs billing processing for this streaming main information. Specifically, the billing unit 516 registers billing data concerning the cellular telephone 1, to which the streaming main information was transmitted, with the billing database 55 of the information providing system 5. Thereafter, the billing unit 516 charges the users of each cellular telephone 1 for the billing data registered with the billing database 55.

Here, the streaming main information to be displayed in response to the information request signal is displayed on the second display part 13 of the cellular telephone only for a limited certain time (five to ten minutes, for example) concerning the corresponding streaming sub information. Moreover, after passage of this certain period, the cellular telephone 1 is configured to display the streaming sub information again.

Here, in the above-described embodiment, the streaming sub information and the steaming main information is transmitted and received by use of the specified information for specifying the streaming sub information. Next, the embodiment will be described based on a case of using a registration method to register the streaming sub information and the streaming main information to be transmitted to each cellular telephone 1 with the information providing system 5 in advance. Here, the registration method includes two methods, namely, a first registration method and a second registration method.

The first registration method is configured to register the streaming main information subject to browsing in advance when users of each cellular telephone 1 performs user registration with the information providing system 5, for example. Specifically, the server 51 of the information providing system 5 includes the storage unit 514, which registers (stores) the streaming sub information and the streaming main information so as to link with the terminal identification information of each of the cellular telephones 1 in advance. Moreover, the sub information transmission unit 511 makes reference to the storage unit 514, and transmits the streaming sub information registered with the storage unit 514 in response to the terminal identification information to the cellular telephone 1 corresponding to each terminal identification information. Meanwhile, the main information transmission unit 513 makes reference to the storage unit 514, and transmits the streaming main information corresponding to the terminal identification information received from the cellular telephone 1 to the cellular telephone 1 relevant to the terminal identification information.

The second registration method is configured to allow the users to input a prescribed operating instruction to the cellular telephone 1 when the users wish to browse certain streaming main information after performing the user registration. Upon receipt of the operating instruction by the user, the cellular telephone 1 transmits the registration request signal including information identification information for specifying the given streaming main information and streaming sub information to the information providing system 5.

Specifically, the registration unit 21 of the cellular telephone 1 transmits the registration request signal for registering the given streaming sub information and streaming main information to the wireless base station 3 together with the information identification information for specifying the streaming sub information and the streaming main information and also with the terminal identification information. Then, the sub information reception unit 16 receives the streaming sub information transmitted in response to the registration request signal, and displays the received streaming sub information on the first display part 11.

The registration acceptance unit 515 of the server 51 of the information providing system 5 receives the registration request signal, the information identification information for specifying the streaming sub information and the like, and the terminal identification information from the cellular telephone 1 through the wireless base station 3. Thereafter, the registration acceptance unit 515 registers (stores) the received terminal identification information and information identification information in the storage unit 514 while linking both pieces of information with each other. Then, the sub information transmission unit 511 makes reference to the storage unit 514, and transmits the streaming sub information corresponding to the information identification information to the cellular telephone 1 relevant to the terminal identification information through the wireless base station 3. Meanwhile, upon receipt of the information request signal together with the terminal identification information, the main information transmission unit 513 acquires the information identification information corresponding to the received terminal identification information from the storage unit 514. Thereafter, the main information transmission unit 513 transmits the streaming main information specified by the acquired information identification information to the cellular telephone 1 identified by the terminal identification information.

Next, an operation of the first registration method will be described.

Here, the information identification information for the streaming sub information and the streaming main information is assumed to be registered in advance with the storage unit 514 of the server 51 of the information providing system 5 in response to the terminal identification information.

Then, the sub information transmission unit 511 of the server 51 makes reference to the storage unit 514, and transmits the streaming sub information registered in response to the terminal identification information to the cellular telephone 1 relevant to the terminal identification information.

The sub information reception unit 16 of the cellular telephone 1 receives the streaming sub information, and displays the streaming sub information on the first display part 11. Thereafter, upon receipt of the given operating instruction when the streaming sub information is displayed, the request transmission unit 17 transmits the information request signal together with the terminal identification information for identifying the cellular telephone 1.

The main information transmission unit 513 of the server 51 of the information providing system 5 receives the information request signal from the cellular telephone 1 together with the terminal identification information. Then, the main information transmission unit 513 acquires the streaming main information specified by the received terminal identification information from the storage unit 514, and transmits the streaming main information to the cellular telephone 1 relevant to the terminal identification information.

Next, an operation of the second registration method will be described.

The registration unit 21 of the cellular telephone 1 transmits the registration request signal for registering the streaming sub information and the streaming main information to the wireless base station 3 together with the information identification information and the terminal identification information.

Thereafter, the registration acceptance unit 515 of the server 51 of the information providing system 5 receives the registration request signal, the information identification information, and the terminal identification information from the cellular telephone 1 through the wireless base station 3. Then, the registration acceptance unit 515 registers the information identification information and the terminal identification information with the storage unit 514 while linking both pieces of information with each other. Thereafter, the sub information transmission unit 511 transmits the streaming sub information corresponding to the received information identification information to the cellular telephone 1.

The sub information reception unit 16 of the cellular telephone 1 receives the streaming sub information transmitted through the wireless base station 3, and displays the received streaming sub information on the first display part 11. Then, the request transmission unit 17 accepts the given operating instruction and transmits the information request signal together with the terminal identification information.

The reception unit 512 of the server 51 of the information providing system 5 receives the information request signal from the cellular telephone 1 together with the terminal identification information. Thereafter, the main information transmission method specifies the streaming main information by use of the information identification information registered with the storage unit 514 in response to the received terminal identification information, and transmits this streaming main information to the cellular telephone 1 relevant to the terminal identification information.

According to this embodiment, the cellular telephone 1 displays the streaming sub information sequentially transmitted from the transmission source on the first display part, requests the streaming main information upon receipt of the instruction by the user, and displays the streaming main information on the second display part. In this way, it is possible to browse necessary information at once when necessary, and to significantly improve convenience.

Moreover, the cellular telephone 1 of this embodiment allows the user to browse information such as an image at the very moment at once when necessary. To be more precise, when the soccer game is relayed, the user does not have to watch the relay of this soccer game all the time as the streaming main information. Instead, when the user recognizes a goal through the streaming sub information, the user can browse the streaming main information representing the moment of the goal at once.

Moreover, in this embodiment, the cellular telephone 1 receives and stores the specified information for the streaming sub information together with reception of the streaming sub information. Then, the cellular telephone 1 transmits the information request signal for requesting the streaming main information together with the specified information. In this way, it is possible to specify the streaming main information that the user wishes to browse. Accordingly, the user can browse the streaming main information easily and efficiently. In addition, by operating the key provided on the cellular telephone, it is possible to display the streaming main information with a simple operation.

Moreover, the cellular telephone of this embodiment may transmit the registration request signal for registering the streaming sub information and the like in advance. In this way, it is possible to browse the streaming sub information and the like registered in advance.

Moreover, in this embodiment, the first display part 11 of the cellular telephone 1 applies the light reflection method for display. Accordingly, the first display part configured to display the steaming sub information constantly can be operated at low power and is therefore economical.

Note that the present invention is not limited to the above-described embodiment, and various modifications are possible within the scope of the invention. For example, in the above-described embodiment, the server 51 transmits the streaming main information after a certain period of time in the future direction approximately from the time of reception of the request signal for the streaming main information. However, for example, the main information transmission unit 513 of the server 51 may be configured to transmit the streaming main information back to the past of a certain period of time while focusing approximately on the time of reception of the information request signal, and to transmit the streaming main information after a certain period of time in the future direction approximately from the time of reception. In this case, the cellular telephone 1 displays the streaming main information back to the past of a certain period of time while focusing approximately on the time of transmission of the information request signal, and also displays the streaming main information elapsed for a certain time in the future direction from the time of transmission.

Moreover, the main information transmission unit 513 may be configured to continuously transmit the streaming main information approximately from the time of reception in the future direction until a stop instruction is inputted. In this case, the cellular telephone 1 continuously displays the streaming main information from the time of transmission in the future direction until the stop instruction is inputted.

Moreover, in the above-described embodiment, a relay of a sport game such as a soccer game, and a relay of a serious incident, and the like have been used as examples of the streaming main information. However, it is also possible to sequentially transmit a relay in an event of a serious disaster such as an earthquake, or communication traffics influenced by such a serious disaster or the like serially depending on regions serially as the streaming main information. The streaming sub information in this case may be displayed sequentially in each region, such as traffics in South Tokyo area, traffics in North Tokyo area, traffics in Kanagawa area, and so on. In this case, the user can browse such streaming sub information and request the traffics of the region which the user needs to see, for example.

Figure 4A:
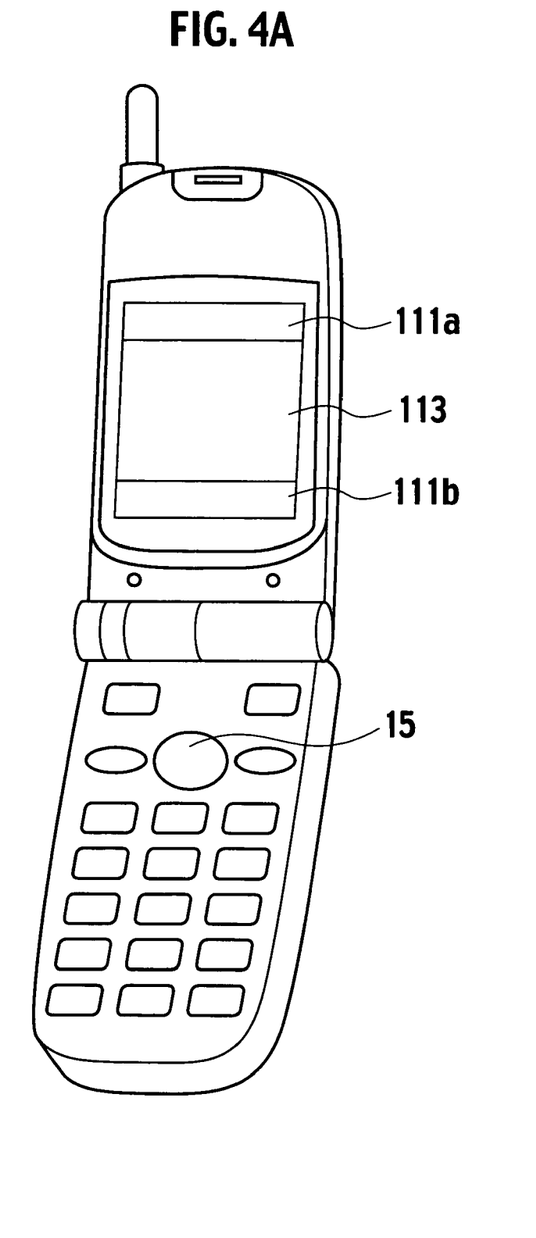
FIG. 4A is a view showing an external structure of a cellular telephone.

Meanwhile, the above-described embodiment has been described based on a case where there was the single first display unit 11. However, as shown in FIG. 4A, for example, a display of the cellular telephone 1 may include a plurality of first display parts 111*a* and 111*b*. The user may browse a plurality of pieces of streaming sub information respectively displayed on the plurality of first display parts 111*a* and 111*b* and select a desired piece therefrom; meanwhile, the streaming main information corresponding to the selected piece of streaming sub information may be displayed on a second display part 113.

Figure 4B:
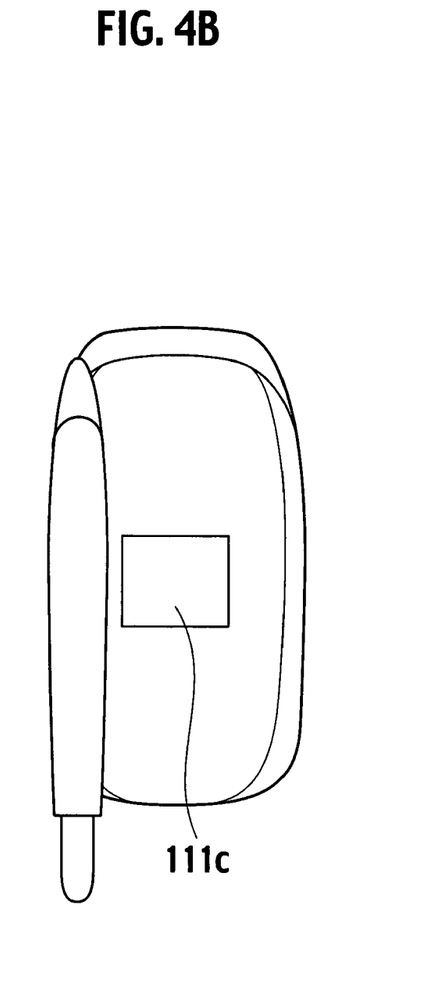
FIG. 4B is another view showing the external structure of the cellular telephone.

Moreover, the cellular telephone 1 (see FIG. 1) of the above-described embodiment is provided with the first display part 11 and the second display part 13 which are located on the main display 10 to be folded inward. However, as shown in FIG. 4B, it is also possible to form a first display part 111*c* as a so-called sub display part provided outside the folded cellular telephone, and to form the second display part 113 as a so-called main display unit located inside the folded cellular telephone. Moreover, the cellular telephone 1 is not limited to a folding cellular telephone, and the present invention is also applicable to a non-folding cellular telephone.

Moreover, in the above-described embodiment, the hot key 15 is used for the prescribed operation with the cellular telephone 1. However, when the first display part 11 is formed as the sub display unit outside the cellular telephone 1 as shown in FIG. 4B, it is possible to browse the streaming sub information displayed on the first display part 11 while folding the cellular telephone 1. In this case, it is possible to set an unfolding operation of the cellular telephone 1 as equivalent to the prescribed operation, whereby the information request signal for requesting the streaming main information may be transmitted when the cellular telephone 1 is unfolded.

What is claimed is:

1. An information providing device comprising:
a sub information transmission unit configured to transmit a plurality of pieces of streaming sub information;
a reception unit configured to receive an information request signal for requesting streaming main information related to each piece of the streaming sub information from a communication terminal device;
a main information transmission unit configured to transmit the streaming main information to the communication terminal device; and
a storage unit configured to store information identification information for specifying the streaming sub information and the streaming main information, and the terminal identification information for identifying the communication terminal device while linking both pieces of information with each other,
wherein the sub information transmission unit makes reference to the storage unit and transmits the streaming sub information to the communication terminal device corresponding to the terminal identification information,
the reception unit receives the information request signal including the terminal identification information, and
the main information transmission unit makes reference to the storage unit and transmits the streaming main information corresponding to the received terminal identification information to the communication terminal device relevant to the terminal identification information.

2. The information providing device according to claim 1, wherein the sub information transmission unit transmits specified information for specifying each piece of the streaming sub information together with the streaming sub information,
the reception unit receives the information request signal including the specified information and terminal identification information for identifying the communication terminal device, and
the main information transmission unit transmits the streaming main information corresponding to the streaming sub information specified by the received specified information to the communication terminal device relevant to the terminal identification information.

3. The information providing device according to claim 1, wherein the main information transmission unit transmits any of the streaming main information after a lapse of a given time in the future direction from the time of reception of the information request signal, the streaming main information before and after given times based on the time of reception of the information request signal, and the streaming main information elapsed in the future direction from the time of transmission of the information request signal to receipt of a stop instruction.

4. An information providing device comprising:
a sub information transmission unit configured to transmit a plurality of pieces of streaming sub information;
a reception unit configured to receive an information request signal for requesting streaming main information related to each piece of the streaming sub information from a communication terminal device;
a main information transmission unit configured to transmit the streaming main information to the communication terminal device; and
a registration acceptance unit configured to receive a registration request signal including information identification information for specifying the streaming sub information and the streaming main information, and, terminal identification information for identifying the communication terminal device from the communication terminal device, and to store the registration request signal in a storage unit,
wherein the sub information transmission unit makes reference to the storage unit and transmits the streaming sub information to the communication terminal device corresponding to the terminal identification information,
the reception unit receives the information request signal including the terminal identification information, and
the main information transmission unit makes reference to the storage unit and transmits the streaming main information corresponding to the received terminal identification information to the communication terminal device relevant to the terminal identification information.

5. A program to be executed by an information providing device, the program causing the information providing device to function as:
a sub information transmission unit configured to transmit a plurality of pieces of streaming sub information;
a reception unit configured to receive an information request signal for requesting streaming main information related to each piece of the streaming sub information from a communication terminal device; and a main information transmission unit configured to transmit the streaming main information to the communication terminal device; and a storage unit configured to store information identification information for specifying the streaming sub information and the streaming main information, and the terminal identification information for identifying the communication terminal device while linking both pieces of information with each other, wherein the sub information transmission unit makes reference to the storage unit and transmits the streaming sub information to the communication terminal device corresponding to the terminal identification information, the reception unit receives the information request signal including the terminal identification information, and the main information transmission unit makes reference to the storage unit and transmits the streaming main information corresponding to the received terminal identification information to the communication terminal device relevant to the terminal identification information.

6. A cellular telephone system including a cellular telephone and an information providing device, the information providing device comprising:

a sub information transmission unit configured to transmit a plurality of pieces of streaming sub information to the cellular telephone;

a reception unit configured to receive an information request signal for requesting streaming main information related to each piece of the streaming sub information from the cellular telephone;

a main information transmission unit configured to transmit the streaming main information to the cellular telephone; and a billing unit configured to perform billing processing for the cellular telephone to which the streaming main information is transmitted, and the cellular telephone comprising:

a first display part configured to display the streaming sub information;

a second display part configured to display the streaming main information related to the streaming sub information;

a sub information reception unit configured to receive the streaming sub information transmitted from the information providing device and to display the received streaming sub information on the first display part;

a request transmission unit configured to transmit to the information providing device the information request signal for requesting the streaming main information related to the streaming sub information displayed on the first display part; and a main information reception unit configured to receive the streaming main information and to display the streaming main information on the second display part.

7. A storage medium storing a program to be executed by an information providing device, the program causing the information providing device to function as:

a sub information transmission unit configured to transmit a plurality of pieces of streaming sub information;

a reception unit configured to receive an information request signal for requesting streaming main information related to each piece of the streaming sub information from a communication terminal device;

a main information transmission unit configured to transmit the streaming main information to the communication terminal device; and a registration acceptance unit configured to receive a registration request signal including information identification information for specifying the streaming sub information and the streaming main information, and, terminal identification information for identifying the communication terminal device from the communication terminal device, and to store the registration request signal in a storage unit, wherein the sub information transmission unit makes reference to the storage unit and transmits the streaming sub information to the communication terminal device corresponding to the terminal identification information, the reception unit receives the information request signal including the terminal identification information, and the main information transmission unit makes reference to the storage unit and transmits the streaming main information corresponding to the received terminal identification information to the communication terminal device relevant to the terminal identification information.

* * * * *